July 17, 1934.  J. B. WADE  1,966,658
TREATING DEVICE
Filed Jan. 26, 1933  2 Sheets-Sheet 1

INVENTOR:
JOHN B. WADE,
BY
ATTORNEY.

July 17, 1934.  J. B. WADE  1,966,658
TREATING DEVICE
Filed Jan. 26, 1933  2 Sheets-Sheet 2

INVENTOR:
JOHN B. WADE,
BY
ATTORNEY.

Patented July 17, 1934

1,966,658

UNITED STATES PATENT OFFICE 1,966,658

TREATING DEVICE

John B. Wade, Los Angeles, Calif., assignor of one-half to Henry J. McKenzie, Los Angeles, Calif.

Application January 26, 1933, Serial No. 653,649

13 Claims. (Cl. 210—17)

My invention relates to means for adding small amounts of a fluid material to a flow of another fluid, as for example the admixture of a disinfectant or purifying agent with water for the purpose of destroying and preventing the growth of bacteria or small animal life therein.

Considerable difficulty has been encountered in keeping the waters of reservoirs free from growths or bacteria such as algae, and small shellfish life. To eliminate and prevent such life or growths a number of chemicals are employed, among them being chlorine and copper sulphate. Chlorination of the water of reservoirs is relatively expensive and requires the use of expensive equipment. To add copper sulphate to the water of reservoirs, a practice followed has been to drag a cloth bag filled with copper sulphate through the water behind a boat, such boat being propelled back and forth from one end of the reservoir to the other. This practice may temporarily eliminate the undesirable life in the water, but such life or growth soon returns. It is found that a small amount of copper sulphate thoroughly intermixed with the water will produce satisfactory disinfecting or purifying results. For example, I have found that by adding less than one part of copper sulphate to every million parts of water delivered into an uncontaminated reservoir, the water stored therein will be kept entirely free from algae and other undesirable growths or life, but to obtain these results the water must be evenly impregnated.

It is accordingly an object of my invention to provide a device of simple and effective character for adding to a flow of water a small and accurately gauged proportion of a treating agent in fluid form. By use of my simple device the water flowing through mains to a storage reservoir may have the desired quantity of the treating agent added thereto, thereby assuring that the entire body of water contained in the reservoir will be constantly impregnated to a desired degree.

It is a further object of the invention to provide a device of the above general character having a container for the treating fluid connected through a delivery passage with the water delivery pipe, and being so constructed that the feeding of the treating fluid is accomplished by motivating forces produced by the movement of water in the pipe to which the treating device is connected.

It is a further object of the invention to provide a device of the above character having a simple and novel flow regulating means for the treating fluid, and it is a still further object of the invention to provide a device of this character in which a constant feeding of the treating fluid is maintained regardless of the quantity of treating fluid in the fluid container of the treating device; thereby assuring a constant treatment of the entire flow of water passing into a reservoir.

Further objects and advantages of the invention will be set forth in the following part of the specification.

Referring to the drawings which are for illustrative purposes only:

Figure 1:
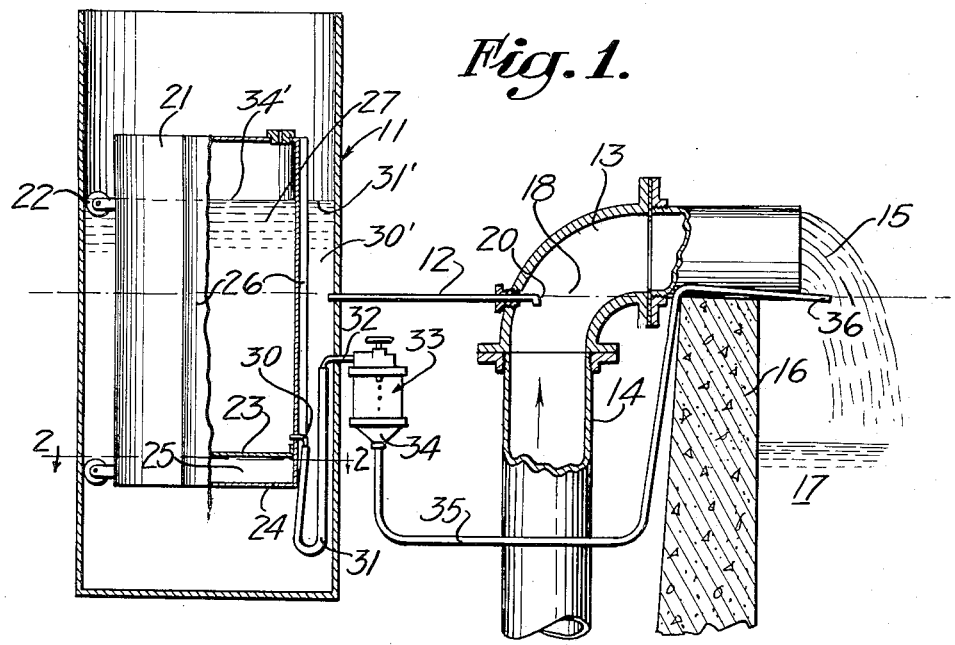
Fig. 1 is a vertically sectioned view showing a form of my invention adapted for attachment to a water carrying pipe at a point near the discharge end thereof.

Although my invention may be used to impregnate one fluid with another fluid, I find that it is especially adapted to the impregnation of water with copper sulphate which is obtainable commercially in the form of crystals. To be used in the device, the copper sulphate must be dissolved in a liquid such as water, which may be done by percolating the water through copper sulphate crystals placed in the fluid container of the device in powdered form, or by forming a solution of the copper sulphate in water and placing quantities thereof in the fluid chamber of the device as needed. In the form of the invention shown in Figs. 1 and 2, I employ a float chamber 11 connected through a pipe 12 with a right angled bend fitting 13 of a water discharge pipe 14 which is shown delivering a flow of water 15 over the wall 16 of a reservoir 17. When the flow of water is shut off in the discharge pipe 14, water will stand in the upright portion thereof at a level indicated by the line 18, and the pipe 12 is preferably placed at this level, with the inner end 20 thereof preferably bent to face the flow of water through the pipe 14.

In the float chamber 11 a floating container 21, having guide rollers 22 externally mounted thereon, as shown, to guide the container 21 in its vertical movement, and having at the bottom thereof walls 23 and 24 forming an air or displacement chamber 25 having a flotation capacity equal to the weight of the container 21. On the vertical side walls of the container 21 are hollow half-tubes 26 forming compensating flotation chambers to compensate for the added weight of the copper sulphate solution 27 in the container 21, as compared to the weight or specific gravity of the water 30 in which the container 21 floats.

From an outlet pipe 30 near the bottom of the container 21, a flexible conduit or hose 31 extends to a pipe 32 which projects through the wall of the float chamber 11 to a flow controlling device 33, the outlet 34 of which connects to a copper sulphate delivery pipe 35 having its discharge end 36 disposed in the horizontal plane 18 and in the path of the discharging flow of water 15, so that copper sulphate may be delivered to the flow of water issuing from the pipe 14, and so that the discharge end 36 of the pipe 35 will be washed by the flow of water to prevent formation of crystals thereon.

When water is flowing through the delivery pipe 14, a pressure is exerted in the tube 12 in proportion to the velocity of the flow of water in the pipe 14 passing the downwardly bent inner end 20 of the tube 12, this pressure causing water 30' to flow into the float chamber 11 and rise to a level 31' above the plane indicated by the line 18 to such a point that the head exerted by the body of water 30' equals the pressure produced in the pipe 12 by the impact of the flow of water in the pipe 14 against the downwardly bent end 20 of the pipe or tube 12.

Owing to the balanced flotation of the containers 21 and the compensating flotation of the chambers 26 thereon, the level 34' of the solution 27 in the container 21 will at all times coincide with the water level 31'; therefore, the level 34' of the solution 27 will be raised above the level or plane 18 of the outlet 36, a distance or height proportionate to the quantity of water 15 flowing through the pipe 14. If the amount of water flowing through the pipe 14 is small or large, the rise of the water level 31' above the plane 18 will be correspondingly little or great.

Figure 2:
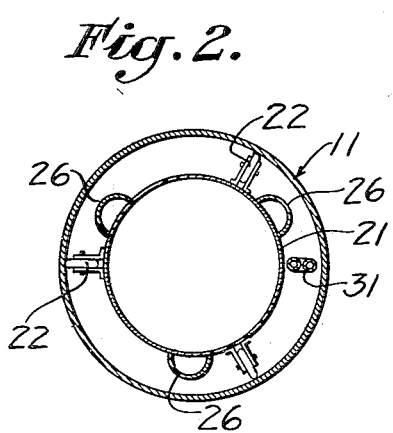
Fig. 2 is a cross-section on a plane represented by the line 2—2 of Fig. 1.
Figure 3:
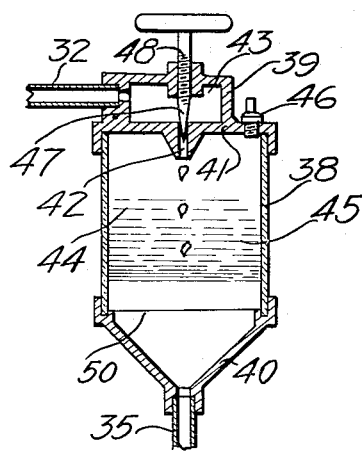
Fig. 3 is an enlarged vertically sectioned view of the flow regulating device shown in Fig. 1.

An especial feature of my invention resides in the flow controlling device 33, which as shown in Fig. 1, comprises a cylindrical member 38, preferably a section of glass tubing in vertical position, having end fittings 39 and 40 secured thereto. The fitting 39 includes a wall 41 having a needle valve passage 42 therein, the upper end of which passage communicates with a space 43 to which the pipe 32 connects as shown, and the lower end of which connects with the space 44 within the glass tube 38. A valve needle 47 on the lower end of an adjusting screw 48 is set to nearly close the valve passage 42. The container 21, the hose 31, the device 33, and the piping 35 being filled with copper sulphate solution to the level 18, a body of non-aqueous fluid, lighter than the solution, such as oil or air 45, may be forced into the space or chamber 44 of the device 33 through a valve 46. Owing to the fact that it is lighter than the solution, the fluid 45 will always float on the part of the liquid or solution 50 in the lower part of the device 33 and in the piping 35, and will rest against the wall 41. When there is no flow of water 15 through the pipe 14, the water level 31' and the fluid level 34 in the container 21 will be in the horizontal plane 18, and accordingly the pressures in the opposite ends of the valve passage 42 will be equal; but, when there is a flow of water through the pipe 14, the levels 31' and 34 will rise above the plane 18 and there will be an excess of pressure at the upper end of the passage 42 of the device 33 to cause a flow of fluid therethrough controlled by the valve needle 47 to a drop-by-drop rate. The rate of flow of the water through the piping 14 may be measured by any of the known means and the needle 47 may be adjusted to give the desired number of drops of solution per minute, which drops, as indicated at 52 may be counted as they pass downwardly through the body of fluid 45 in the chamber 44 into the quantity of solution 50, to displace a like amount of such fluid downwardly into the pipe 35 and thereby cause drops of solution to issue from the discharge end 36 of the pipe 35 into the flow of water 15 to intermix with and impregnate the same.

As previously herein explained, the velocity of the water flowing through the pipe 14 varies with the quantity thereof, and the pressure in the impact tube 12 varies with the velocity of the water in the pipe 14; consequently the height of the water level 31' in the float chamber 11 will vary with the quantity of water being conducted through the pipe 14 into the reservoir 17. Likewise the flow of solution through the controlling device 33 will vary with the change in height of the level 31' and the flow of water through the pipe 14. This being so, the feeding of the impregnating solution will automatically change with the flow of water through the pipe 14, so that after the needle valve is once set the impregnating device will function without further care, other than adding solution to the container 21 as required.

Figure 4:
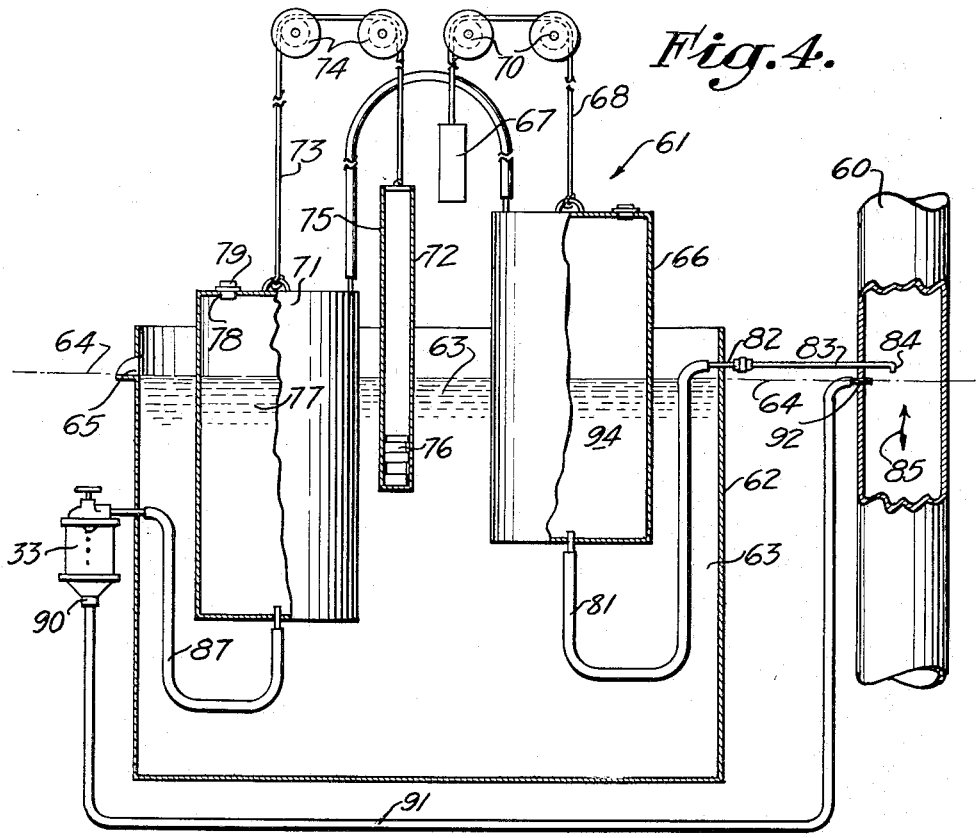
Fig. 4 is a vertically section of a form of my invention adapted for connection to a pipe in which water is flowing under pressure.

In Fig. 1 of the drawings I have shown a form of my invention for impregnating a flow of water not under pressure. In Fig. 4 I show a form of the invention for connection with a pipe 60 through which water is flowing under pressure. The device 61 shown in this figure consists of a tank 62 in which a body of water 63 is maintained at a level indicated by a line 64, there being an overflow opening 65 in the tank 62 to limit the height to which the level of the water 63 may be raised.

An air-tight container 66, counterbalanced by a member 67 of equal weight connected thereto by a cable 68 extending over pulleys 70, floats in the rightward portion of the body of water 63. Floating in the leftward part of the body of water 63 is an air-tight container 71 which is connected to a counterweight 72 by means of a cable 73 extending over pulleys 74. The counterweight 72 consists of a vertically disposed tubular member 75 of metal, closed at its lower end, and having its weight supplemented by weights 76 to equal the weight of the container 71 and the copper sulphate contained in the solution 77 in the container 71, which solution may be placed therein through a filling port 78 having a cap 79.

From the bottom of the container 66 a flexible tube 81 extends to a pipe 82 which in turn connects to an impact tube 83 which projects into the pipe 60 substantially at the level 64, this impact tube having its inner end 84 bent to face the flow of water in the pipe 60 indicated by the arrow 85. The upper end of the container 66 is connected through a flexible hose 86 with the upper end of the container 71, so that the internal pressures of the two containers 66 and 71 will be equalized. From the lower end of the container 71 a flexible tube 87 is adapted to convey solution from the container 71 to the flow controlling device 33 of the same character as that shown in Fig. 2. From the outlet 90 of the device 33 a conduit 91 extends to the nipple 92 which projects into the pipe 60.

The operation of the device 61 shown in Fig. 4 is as follows: The pressure in the impact or Pitot tube 83 varies with the quantity of water flowing through the pipe 60. This pressure causes the water 94 to flow into the container 66 until the pressure of the air in the upper parts of the containers 66 and 71 equals the impact pressure in the tube 83. Owing to the counterbalanced condition of the containers 66 and 71, the level 95 of the water 94 in the container 66 will always coincide with the level indicated by the line 64; therefore, there will be no reacting pressure head exerted by the water 94 against pressure in the tube 83. The air pressure created in the containers 66 and 71 in this manner is transmitted to the solution 77 in the container 71, and since this pressure is greater than the static head of the water in the pipe 91, in proportion to the amount of water flowing in the pipe 60, there will be a drop-by-drop flow of the solution through the metering device 33, and since the pressure exerted on the solution 77 varies proportionately to the flow of water in the pipe 60, the flow of solution through the metering device 33 will be likewise proportionately varied. Therefore, the device 33 will not have to be readjusted upon each change in flow of the water in the pipe 60, but will automatically cause delivery to the flow of water the required amount of the treating solution.

Figure 5:
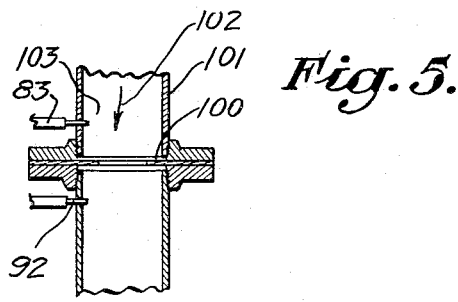
Fig. 5 is a fragmentary section showing an alternative means for use in my invention to produce the proportionate pressure difference for causing a feeding of the treating fluid.

There are a number of ways in which the propelling or actuating pressure, controlled by the flow of water in the pipe 60, may be obtained. For example, the pressure on opposite sides of the weir or orifice member 100 of Fig. 5 may be employed for this purpose. A flow of water in the pipe 101 containing the member 100, in the direction of the arrow 102, will cause a greater pressure on the near side 103 of the member 100, in accordance with the velocity and quantity of the water. Tubes 83' and 91', corresponding to the pipe members 83 and 91 of Fig. 4, may be connected into the pipe 101 on opposite sides of the orifice member 100, it being understood that the tubes 83' and 91' are thus adapted for connection to an impregnating device 61.

I claim as my invention:

1. A device of the character described, for impregnating a flow of fluid in a duct, including: A container for an impregnating fluid; means for maintaining a constant static pressure in said impregnating fluid; a delivery pipe connecting said container with said duct; a flow controlling device connected with said pipe; and means for placing a pressure on said impregnating fluid proportionate to the magnitude of said flow of fluid in said duct to move the impregnating fluid from said container through said flow controlling device and said pipe into said flow of fluid in said duct.

2. A device as defined in claim 1, in which said pressure means is actuated in consequence of the velocity of fluid in said duct.

3. A device as defined in claim 1, in which said flow controlling device comprises a chamber member in the path of flow of the impregnating fluid for containing a body of fluid immiscible with the said impregnating fluid, and a valve for causing said impregnating fluid to pass through said fluid in said chamber in drop-by-drop order.

4. A device of the character described, for impregnating a flow of fluid in a duct, including: A container for an impregnating fluid; means for maintaining a constant level of said impregnating fluid; a delivery pipe connecting said container with said duct; a flow controlling device connected with said pipe, comprising a chamber member in the path of flow of said impregnating fluid for containing a body of oil, and valve means for causing said impregnating fluid to pass through said oil in drop-by-drop order; and means for placing a pressure on said impregnating fluid in consequence of the flow of fluid in said duct.

5. A device as claimed in claim 4, in which said pressure means is actuated in consequence of the velocity of fluid in said duct.

6. A device of the character described, for impregnating a flow of fluid in a duct, including: A pair of tubes connected to said duct, there being means producing a pressure difference in said tubes proportionate to the flow of fluid in said duct; and a feeding device for said impregnating fluid connected to said tubes, said device including a container for the impregnating fluid, means for maintaining a constant static pressure in said impregnating fluid, and a flow controlling valve connecting said container to the one of said tubes in which the relatively low pressure exists.

7. A device of the character described, for impregnating a flow of fluid, including: Walls forming a passage having both ends thereof connected to said fluid, a container in said passage for holding an impregnating medium adapted to flow through said passage; means for maintaining a constant static pressure in said impregnating medium and flow controlling means for said passage actuated in accordance with the quantity of said flow of fluid.

8. A device as claimed in claim 7, in which said flow controlling means is in turn controlled by the flow of fluid whereby the quantity of said impregnating medium flowing through said passage is varied in accordance with the said flow of fluid.

9. A device of the character described, for impregnating a flow of fluid, including: walls forming a passage having both ends thereof connected to said fluid; a container in said passage for holding an impregnating medium adapted to flow through said passage and the outlet end thereof into said fluid; means for maintaining a constant static head in said impregnating medium with relation to the outlet of said passage; and means for placing a pressure of gas on said impregnating medium proportioned in accordance with the flow of said fluid to be impregnated.

10. A device as defined in claim 9 in which said gas pressure means comprises a gas chamber connected to said passage so as to receive fluid from said flow of fluid through the inlet of said passage, and means for maintaining a constant static head of said fluid in said chamber.

11. A device as defined in claim 9 in which said gas pressure means comprises a gas chamber formed as part of said passage so as to receive fluid from said flow of fluid to be impregnated through the inlet of said passage, and means for maintaining a constant level of said fluid in said chamber relative to the inlet of said passage.

12. A device of the character described for impregnating a flow of fluid, including: a container for an impregnating medium; delivery means connecting said container to said flow of fluid; means for exerting a propelling pressure on said impregnating medium to cause it to flow through said delivery means into said flow of fluid; and means for raising said container as the quantity of said impregnating medium therein reduces, so as to maintain a constant static head of said impregnating fluid.

13. A device as defined in claim 12 in which said means for exerting said propelling pressure comprises a chamber member connected to said flow of fluid so as to receive fluid under pressure therefrom, an air tube connecting the upper part of said chamber member with the upper part of said container, and means for automatically raising and lowering said chamber member so as to maintain a constant level of said fluid in said chamber member.

JOHN B. WADE.